Feb. 29, 1944.  P. F. BECHBERGER  2,342,637
MEANS FOR REPRODUCING MOTION
Filed Sept. 10, 1941  2 Sheets-Sheet 2
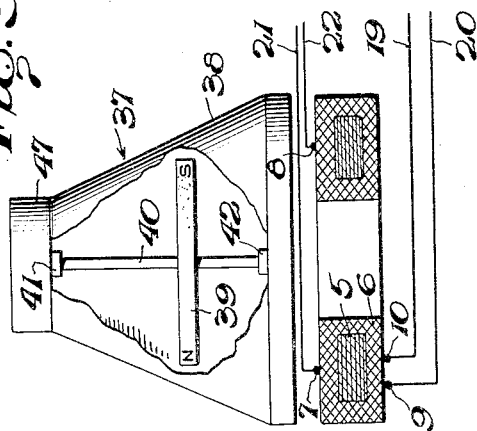
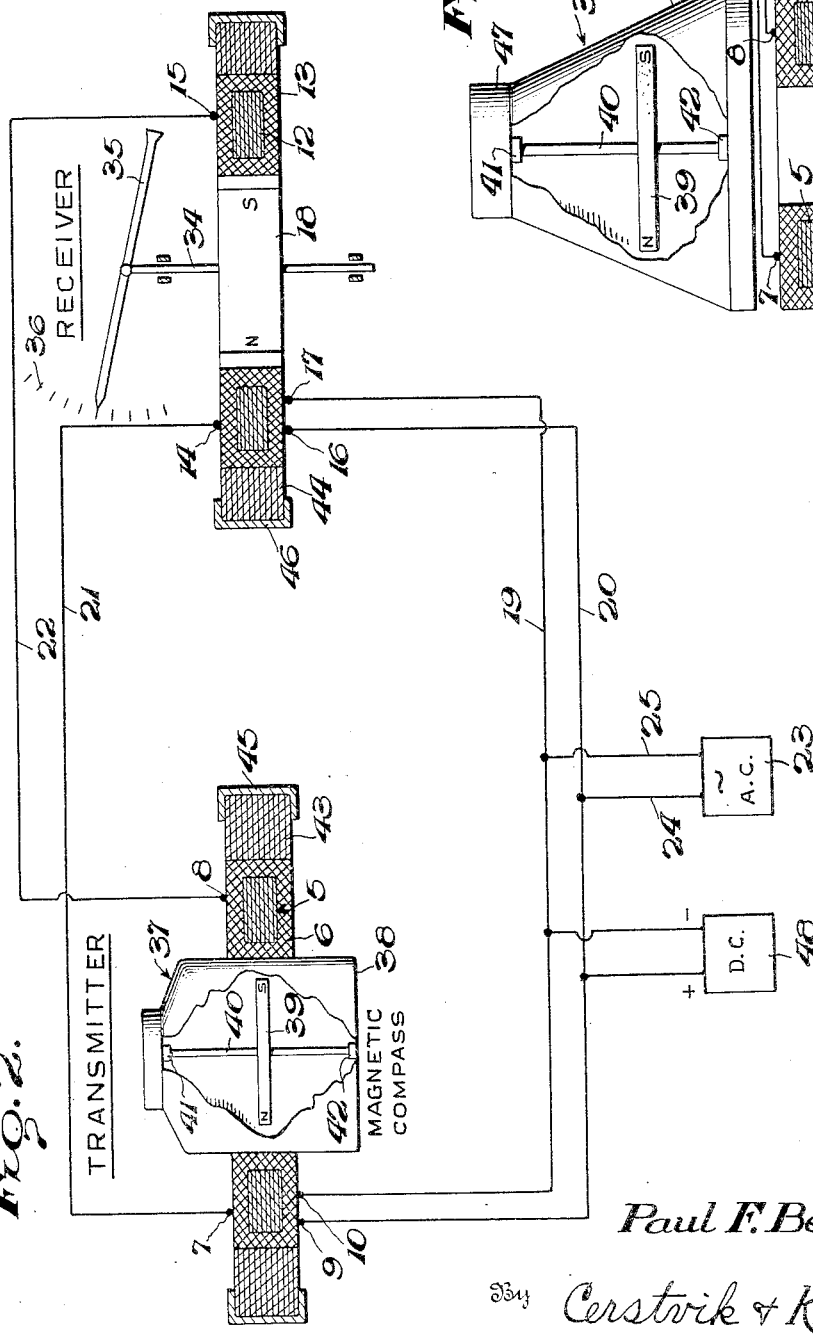
Inventor
Paul F. Bechberger
By Cerstvik & Kalman
Attorneys Patented Feb. 29, 1944

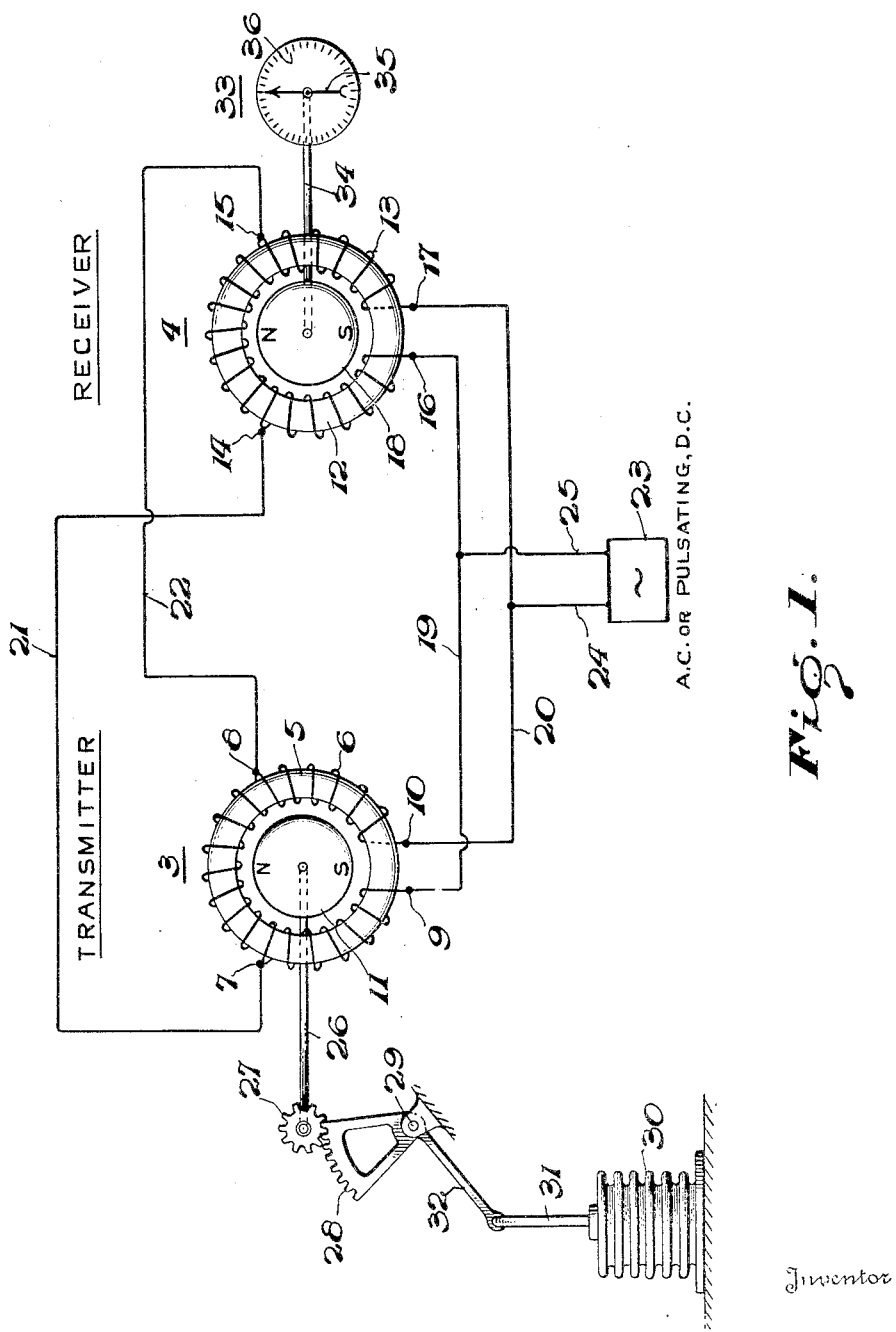

2,342,637

UNITED STATES PATENT OFFICE 2,342,637

MEANS FOR REPRODUCING MOTION

Paul F. Bechberger, Tenafly, N. J., assignor to Bendix Aviation Corporation, Bendix, N. J., a corporation of Delaware Application September 10, 1941, Serial No. 410,343

24 Claims. (Cl. 33—222)

The present invention relates to means for reproducing motion, more particularly to means for reproducing angular motion at a remote point, and constitutes a novel improvement, adaptation and simplification of the structure of the invention disclosed in the co-pending application of Wladimir A. Reichel, Serial No. 344,795, filed July 10, 1940, now Patent No. 2,269,602, dated January 13, 1942, which is assigned to the assignee of the present invention.

The apparatus of the present invention, like that of the invention disclosed in the aforesaid Patent 2,269,602, is especially adapted for remote indication, i. e., for measuring the value of a factor at one point by means of some suitable measuring instrument and then transmitting that value to and indicating it at another and remote point, but may also be utilized for remote control of other objects if so desired.

In the aforesaid Patent 2,269,602, the apparatus includes a transmitter and a remote receiver electrically connected together, the transmitter and receiver consisting of a pair of substantially similar electromagnetic devices each of which comprises a stator having a core of magnetically permeable material with a polyphase winding and a single phase winding thereon in inductive relation with each other, and a rotor comprising a poled magnet associated in magnetic relation with the core and windings. One of the windings of the transmitter and the corresponding winding of the receiver are energized by means of a periodically varying current which may be an alternating current or a pulsating direct current, and then when the poled magnet rotor of the transmitter is rotated the poled magnet rotor of the receiver will rotate correspondingly and synchronously.

In accordance with the present invention, the polyphase winding and the single phase winding of each of the devices are replaced by a single winding or coil having a plurality of taps, and the tapped winding of the transmitter stator is electrically connected to corresponding taps of the winding of the receiver stator, thereby eliminating a winding without eliminating its function, and simplifying the structure of the prior devices.

Accordingly, one of the objects of the invention is to provide a novel and improved system for reproducing motion at a remote point and embodying a pair of novel electromagnetic devices one of which is a transmitter and the other a receiver, and each of which comprises a wound stator cooperating with a magnet rotor having no windings thereon, thereby eliminating brushes, slip rings and commutators.

In accordance with the present invention, it has also been found that the system is readily adapted to remote reading compasses or magnetic compass repeaters, whereby the directional indication of a master magnetic compass is repeated or reproduced by one or more indicators or repeaters located at points remote from said master magnetic compass, this being accomplished by removing the magnet rotor of the transmitter and placing the wound stator in cooperative relation with the magnet of the compass, whereby said compass magnet then functions as a rotor of the transmitter, and the use of a separate rotor or of a follow-up motor and relays is rendered unnecessary. Therefore, another object of the invention is to provide a novel repeater system for magnetic compasses, wherein the directional indication that is applied to the transmitter is derived from the compass without any mechanical connection to the rotatable magnet system of the compass and without the use of any relays or follow-up motors.

Another object of the invention is to provide a novel magnetic compass repeater system wherein the transmission of the compass indication to distant repeaters or indicators does not interfere in any way with the operation of the compass itself.

A further object is to provide a novel magnetic compass repeater system, whereby it becomes unnecessary to alter or modify the compass structure in any way when the transmitter is adapted to the compass.

The above and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for purposes of illustration only, and are not to be construed as defining the limits of the invention, reference being had for this purpose to the appended claims.

In the drawings, wherein like reference characters refer to like parts in the three views, Fig. 1 is a more or less diagrammatic illustration of one embodiment of the invention as applied to the production of a remote indication by an altimeter, for example, and shows a transmitter and one receiver with their magnetic and electric circuits and connections;

Fig. 2 is a similar illustration of another embodiment of the invention as applied to a magnetic compass for producing remote indications by said compass, and shows the transmitter and receiver in cross-section; and Fig. 3 is another embodiment of the invention applied to a compass, showing only the transmitter with the stator thereof located beneath the compass.

Referring now to the drawings and more particularly to Fig. 1, the novel apparatus of the invention comprises, in the form shown, a transmitter 3 and a distant receiver 4 electrically connected to said transmitter in a manner which will be described hereinafter. It is to be understood of course that two or more such receivers may be connected to said transmitter 3.

The transmitter comprises a stator and a rotor in cooperative relation, the stator consisting of a core 5 in the form of a laminated annulus or ring of highly permeable magnetic material such, for example, as "Permalloy" or "Mumetal," having wound thereon a single coil 6 which is tapped at two or more points as, for example, at points 7 and 8 intermediate the ends 9 and 10 of said coil, the ends and the tapped points being angularly spaced one hundred twenty degrees (120°) apart along the circumference of the core 5.

Concentrically arranged within the stator core 5 of the transmitter and in magnetic relation therewith and with the coil 6 is a rotor 11 in the form of a magnetic member of marked polarity as, for example, a rotatable permanent magnet having north and south poles as indicated at N and S, providing a uni-directional magnet flux which enters the core 5. The rotor 11, in the present instance, is shown in the form of a disc magnet one-half of which constitutes the north pole and the other half the south pole.

The receiver 4 shown in Fig. 1 is located at the remote point and likewise comprises a stator and a rotor in cooperative relation, the stator consisting of a core 12 in the form of a laminated annulus or ring of highly permeable material, having wound thereon a single coil 13 which is also tapped at two or more points as, for example, at points 14 and 15 intermediate the ends 16 and 17 of said coil. As in the case of the transmitter, the ends and the tapped points of coil 13 are angularly spaced one hundred twenty degrees (120°) apart along the circumference of the core 12.

The rotor of the receiver likewise comprises a rotatable permanent magnet 18 in the form of a disc one-half of which constitutes a north pole and the other half a south pole, said magnet providing a uni-directional magnetic flux which enters the core 12.

The ends 9, 10 of the coil 6 of the transmitter stator are electrically connected to the ends 16, 17 of the coil 13 of the receiver stator by means of the leads 19 and 20, respectively, while the tapped points 7 and 8 of coil 6 are electrically connected to the corresponding tapped points 14 and 15 of coil 13 by means of leads 21 and 22 respectively.

Both coils 6 and 13 are energized by either a single phase alternating current or a pulsating direct current from a suitable source 23 connected to the leads 19 and 20 by means of leads 24 and 25, respectively. The source 23 may be a generator, alternator, an interrupter or a vacuum tube oscillator, for example.

It will be seen that the tapped points 7, 8 of coil 6 and the tapped points 14, 15 of coil 13 constitute, in effect, polyphase connections, while the ends 9, 10 and 16, 17 of said coils constitute single phase connections. In other words, the entire length of each coil is single phase so that said coils correspond to the single phase windings shown in the aforesaid application Serial No. 344,795, while the tapped sections, in effect, divide the coils into sections that are one hundred twenty degrees (120°) apart and correspond to the polyphase windings shown in said application Serial No. 344,795. Thus, coils 6 and 13 function as auto-transformers having input terminals 9, 10 and 16, 17 and output terminals 7, 8 and 14, 15.

Means are now provided for rotating the rotor 11 of the transmitter 3 in accordance with and in response to the factor to be measured and to be indicated at the distant receiver 4 in substantially the same manner as disclosed in the aforesaid application Serial No. 344,795. Such means comprise, in the present instance, a drive shaft 26 having one end connected to the magnet rotor 11 and carrying at its other end a pinion 27 meshing with a gear sector 28 which is pivoted at 29 and connected to a measuring instrument such, for example, as an evacuated bellows or altimeter aneroid 30 by means of a link 31 and a lever 32. Thus, upon expansion and contraction of the evacuated bellows or aneroid 30, the gear sector 28 drives the pinion 27 to rotate the magnet rotor 11 in a direction and amount corresponding to the direction and amount of movement of the evacuated bellows or aneroid 30 in accordance with changes in barometric pressure caused by changes in altitude in the present instance, it being understood, of course, that any other type of measuring instrument can be substituted for said aneroid 30.

The magnet rotor 18 of the receiver 4 is drivably connected to an indicator 33 in any suitable manner as by means of a shaft 34 one end of which is connected to the magnet rotor 18 and the other end of which is connected to a pointer 35 which cooperates with a suitable scale 36 of the indicator 33.

Upon energization of the coils 6 and 13 of the transmitter and receiver, respectively, through their ends 9, 10 and 16, 17 from the source 23, voltages are generated in the tapped sections of said coils due to the periodic reversal of the flux produced in the cores 5 and 12 by the periodically varying current flowing in coils 6 and 13 from the source 23. During one-half cycle of the exciting current from source 23 the periodically varying flux opposes the uni-directional flux of the magnet rotors 11 and 18 in one-half of the cores 5 and 12 and, at the same time, aids said uni-directional flux in the other half of the said cores, while during the other half cycle of said exciting current said periodically varying flux aids the uni-directional flux of the magnet rotors 11 and 18 in the one-half of the cores 5 and 12 and, at the same time, opposes said uni-directional flux in the other half of said cores, as fully explained in the aforesaid application Serial No. 344,795. The voltages thus generated in the sections of coils 6 and 13 by the flux variation in cores 5 and 12 are even harmonics of the fundamental frequency of the exciting current from source 23.

When the rotors 11 and 18 are in step, the even harmonic voltages in the sections of coil 6 are exactly equal to the even harmonic voltages in the sections of coil 13 but are in an opposite direction and, as a result, there is no current flow in the connecting leads 19, 20, 21 and 22 by which the sections of coil 6 of the transmitter are connected to the sections of coil 13 of the receiver. If, however, the magnet rotor 11 of the transmitter is angularly displaced by aneroid 30, the secondary voltages in the coil 6 will no longer be equal to the secondary voltages in coil 13, and current will flow in the leads 19, 20, 21 and 22 connecting the sections of coil 6 and the sections of coil 13, thereby producing a resultant magnetic field at the receiver core 12, which reacts with the field of the receiver magnet rotor 18 to produce a torque which rotates said magnet rotor 18 and brings it into step with the magnet rotor 11 of the transmitter in substantially the same manner as set forth in the aforesaid application Serial No. 344,795. Rotation of the receiver rotor 18 actuates the pointer 35 of the indicator 33 to show the amount of angular displacement of transmitter rotor 11 by the aneroid 30 in terms of altitude. Thus, the motion of the transmitter rotor 11 is reproduced at the distant point by the receiver rotor 18 and, hence, the altitude measured by the aneroid 30 is repeated and indicated at the remote point by the indicator 33.

Referring now to Fig. 2 of the drawings, the invention is shown applied to a magnetic compass, whereby the directional indication of said compass is repeated or reproduced by an indicator at a point remote from the compass without any mechanical connection or coupling between the rotatable magnet of the compass and without interfering in any way with the operation of the compass. The repeater system, as shown, comprises a master magnetic compass 37 having a compass bowl 38 in which is rotatably mounted the compass magnet 39 carried by a vertical shaft 40 journalled in an upper bearing 41 and a lower bearing 42 inside of said bowl 38 so that said magnet 39 may rotate under the influence of the earth's magnetic field in the usual manner.

In this embodiment the compass magnet 39 serves as the rotor of the transmitter, thereby eliminating the rotor 11 shown in Fig. 1 and, therefore, the stator core 5 and coil 6 are arranged in such a manner that they surround the compass bowl 38 of the compass so that they are concentric with the compass magnet 39, but the coil 6 is connected to the coil 13 of the receiver in the same manner as in Fig. 1.

The stators of the transmitter and receiver shown in Fig. 2 are substantially the same as in Fig. 1 except that they are provided with laminated annular members 43 and 44 of magnetic material, which serve to provide a return path for the second harmonic flux produced in the core members 5 and 12, the laminations being held together by retainers 45 and 46, respectively. These return path members 43 and 44 also serve as magnetic shields to prevent interaction with other external magnetic fields.

It will thus be seen that when relative rotation of the compass magnet 39 takes place in azimuth under the influence of the earth's magnetic field, such rotation is reproduced at the remote point by the magnet rotor 18 of the receiver and is indicated by the pointer 35 on the scale 36 which is calibrated as a compass rose to indicate the direction of the earth's magnetic field as determined by the compass magnet 39 at the transmitter.

The compass 37 may be provided with a conventional magnetic deviation compensator of any suitable type at the top thereof, which is indicated generally by the reference numeral 47.

In Fig. 2 the coils 6 and 13 are energized by a uni-directional current from a suitable source 48 as well as by an alternating current from source 23. The direct current flowing in the coils 6 and 13 sets up a uni-directional flux in the cores 5 and 12, which flux is aided by the flux of the rotor magnets 39 and 18 in one portion of said cores and is opposed in the diametrically opposite portion of each core. Thus, the magnetic reluctance to the periodically varying portion of the flux in the cores is not uniform throughout, while the ampere-turns-magnetizing-force is uniform around the cores and is accentuated by the return path members 43 and 44.

Instead of providing a separate direct current source 48, a portion of the alternating current from source 23 may be rectified and then supplied as direct current to the coils 6 and 13.

In Fig. 3 is shown another embodiment of a transmitter of a magnetic compass repeating system in which the transmitter stator is located beneath the compass bowl 38 of the compass, but the coil 6 is connected to stator coil (not shown) by leads 21 and 22 and is energized from the source of current (not shown) by leads 19 and 20 as in Figs. 1 and 2. With this arrangement, the transmitter stator may be made smaller than in the embodiment shown in Fig. 2.

There is thus provided a novel and relatively simple apparatus for reproducing motion at a remote point, and one which readily lends itself to a use as a magnetic compass repeater without the use of follow-up motors or relays and without having to alter the structure of the master magnetic compass, the directional indication of which is to be repeated at the remote point. The apparatus involves a minimum number of parts, is small, compact and light in weight, which makes it possible of manufacture in large quantities at low cost, and makes it particularly suitable for installation on aircraft for remote indication of engine temperature, fuel pressure, fuel level, oil pressure, etc.

Although three embodiments of the invention have been illustrated and described as applied to an altimeter and a compass, it may be applied to various other uses where remote indication or remote control is desired, and various changes and modifications in the construction and relative arrangement of the parts, which will now appear to those skilled in the art, may be made without departing from the scope of the invention. Moreover, although in the illustrated embodiments only one receiver is shown connected to the transmitter, two or more such receivers may be connected to said transmitter in parallel with said one receiver without impairing the function of the system in any way. Reference is therefore to be had to the appended claims for a definition of the limits of the invention.

What is claimed is:

1. A magnetic compass repeating system comprising a magnetic compass having a magnet rotatable under the influence of the earth's magnetic field, an annular core member of magnetically permeable material coaxially arranged in influencing relation with said compass magnet, whereby a uni-directional flux is induced in said core member by said magnet, coil means on said core member and having polyphase connections and a single phase connection, a second annular core member of magnetically permeable material located at a point remote from said compass, coil means on said second core member and also having polyphase connections and a single phase connection, the polyphase connections of the first coil means being electrically connected to the polyphase connections of the second coil means in corresponding phase relation, a source of periodically varying current connected to the single phase connection of both of said coil means, and a rotatable magnet associated with the second core member for actuation by the reaction between the magnetic field of said magnet and the magnetic field produced by the coil means of the second core member upon rotation of the compass magnet.

2. A magnetic compass repeating system comprising a magnetic compass having a magnet rotatable under the influence of the earth's magnetic field, an annular core member of magnetically permeable material coaxially arranged in influencing relation with said compass magnet, whereby a uni-directional flux is induced in said core member by said magnet, coil means on said core member and having polyphase connections and a single phase connection, a second annular core member of magnetically permeable material located at a point remote from said compass, coil means on said second coil member and also having polyphase connections and a single phase connection, the polyphase connections of the first coil means being electrically connected to the polyphase connections of the second coil means in corresponding phase relation, a source of periodically varying current connected to the single phase connection of both of said coil means, a rotatable magnet associated with the second core member for actuation by the reaction between the magnetic field of said magnet and the magnetic field produced by the coil means of the second core member upon rotation of the compass magnet, and indicating means actuated by the rotatable magnet at the second core member.

3. An electromagnetic device adapted for use as a transmitter or receiver and arranged for electrical connection to a similar device functioning respectively as a receiver or transmitter, said device comprising a stator including an annular core of magnetically permeable material, an auto-transformer coil wound on said core, said coil having connections at its ends for energizing said coil by a periodically varying current and having a plurality of other connections intermediate its ends for connecting said coil to a corresponding plurality of connections of a coil of a similar device, and a rotor comprising a poled magnet associated in magnetic relation with said core and said coil.

4. A magnetic compass repeating system comprising a magnetic compass having a magnet rotatable under the influence of the earth's magnetic field, an annular core member of magnetically permeable material coaxially arranged in influencing relation with said compass magnet, whereby a uni-directional flux is induced in said core member by said magnet, coil means on said core member and having polyphase connections and a single phase connection, a second annular core member of magnetically permeable material located at a point remote from said compass, coil means on said second core member and also having polyphase connections and a single phase connection, the polyphase connections of the first coil means being electrically connected to the polyphase connections of the second coil means in corresponding phase relation, a source of alternating current connected to the single phase connection of both of said coil means, and a rotatable magnet associated with said second core member for actuation by the reaction between the magnetic field of said magnet and the magnetic field produced by the coil means of the second core member upon rotation of said compass magnet.

5. A magnetic compass repeating system comprising a magnetic compass having a magnet rotatable under the influence of the earth's magnetic field, an annular core member of magnetically permeable material coaxially arranged in influencing relation with said compass magnet, whereby a uni-directional flux is induced in said core member by said magnet, coil means on said core member having polyphase connections and a single phase connection, a second annular core member of magnetically permeable material located at a point remote from said compass, coil means on said second core member and also having polyphase connections and a single phase connection, the polyphase connections of the first coil means being electrically connected to the polyphase connections of the second coil means in corresponding phase relation, a source of alternating current connected to the single phase connection of both of said coil means, a rotatable magnet associated with said second core member for actuation by the reaction between the magnetic field of said magnet and the magnetic field produced by the coil means of the second core member upon rotation of said compass magnet, and indicating means actuated by the rotatable magnet at the second core member.

6. An electromagnetic device adapted for use as a transmitter or receiver and arranged for electrical connection to a similar device functioning respectively as a receiver or transmitter, said device comprising a stator including an annular core of magnetically permeable material, an auto-transformer coil wound on said core, said coil having connections at its ends for energizing said coil by a periodically varying current and having a plurality of other connections intermediate its ends for connecting said coil to a corresponding plurality of connections of the coil of a similar device, and a rotor comprising a circular magnet having north and south poles and rotatably mounted inside of said core in magnetic relation therewith and with said coil.

7. Means for transmitting angular motion from one point to another point, comprising a first relatively stationary annular core of magnetically permeable material at the first point, a coil wound on said core and having a plurality of taps, a rotatable magnet in magnetic relation with said core and coil, a second relatively stationary core of magnetically permeable material at said other point, a coil wound on said second core and also having a plurality of taps corresponding to the number of taps on the coil of said first core, a rotatable magnet in magnetic relation with said second core and coil, means electrically connecting the taps of said first coil to the corresponding taps of said second coil, and a source of periodically varying current connected to energize both of said coils whereby, upon rotation of the magnet at the first core, the magnet at the second core is correspondingly rotated.

8. Apparatus for electrically transmitting the indications of a magnetic compass to a remote point without the use of a follow-up motor or other electro-mechanical torque-amplifying device, comprising a magnetic compass having a magnet rotatable under the influence of the earth's magnetic field, an electrical transmitting device at the compass and having a stator in direct inductive relation with said compass magnet, whereby the latter constitutes the rotor of said transmitting device so that separate coupling means between the compass and transmitting device are eliminated, an electrical receiving device at the remote point and having a rotor and a stator in inductive relation with each other, indicating means drivably connected to the rotor of said receiving device for actuation thereby, and means electrically connecting said transmitting device to said receiving device independently of any follow-up motor or other electro-mechanical torque-amplifying device, whereby angular movement of said compass magnet causes corresponding angular movement of the rotor of said receiving device to actuate said indicating means.

9. Apparatus for electrically transmitting the indications of a magnetic compass to a remote point without the use of a follow-up motor, comprising a magnetic compass having a magnet rotatable under the influence of the earth's magnetic field, an electrical transmitting device at the compass and having a coil wound stator in direct inductive relation with said compass magnet, whereby the latter functions as the rotor of said transmitting device, an electrical receiving device at the remote point and also having a coil wound stator and a rotor consisting of a rotatable magnet in cooperative relation therewith, a source of periodically varying current, means electrically connecting said source to the coil wound stator of both the transmitting device and the receiving device, means electrically connecting the coil wound stator of the transmitting device to the coil wound stator of the receiving device, whereby the angular movement of said compass magnet causes corresponding angular movement of the magnet rotor of said receiving device, and indicating means connected to the magnet rotor of said receiving device for actuation thereby.

10. In combination, a transmitter comprising a first core member of magnetically permeable material, a coil on said core member and having a plurality of taps, a rotatable magnet in influencing relation with said core member for inducing a magnetic flux therein, a receiver comprising a second core member of magnetically permeable material, a coil on said second core member and also having a plurality of taps corresponding to the number of taps on said first coil, the taps of said first coil being electrically connected to the corresponding taps of said second coil, a source of periodically varying current connected to energize both the first coil and the second coil, and a rotatable magnet associated with said second core member and coil for actuation by the reaction between its own field and the field produced by said second coil upon rotation of the magnet at the transmitter.

11. Apparatus for electrically transmitting the indications of a magnetic compass to a remote point without the use of a follow-up motor or other electro-mechanical torque-amplifying device, comprising a magnetic compass having a magnet rotatable under the influence of the earth's magnetic field, an electrical transmitting device at the compass and having a wound stator in magnetic relation with said compass magnet, whereby the latter serves as a rotor of said transmitter for producing electrical energy in said stator in accordance with the amount and direction of relative angular movement between said stator and rotor, an electrical receiving device at the remote point and having a rotor and a stator associated in cooperative relation with each other, indicating means at said receiving device drivably connected to the rotor thereof for actuation thereby, and means electrically connecting said transmitting device to said receiving device independently of any follow-up motor or other electro-mechanical torque-amplifying device, for controlling angular movement of the receiver rotor by and in accordance with the relative angular movement of said compass magnet to actuate said indicating means.

12. An electromagnetic device adapted for use as a transmitter and arranged for electrical connection to a remote receiver, comprising a stator having an annular core of magnetically permeable material, an auto-transformer coil wound on said core, said coil having connections at its ends for energizing said coil by a periodically varying current and having a plurality of other connections for connecting said coil to a corresponding plurality of connections of a coil of the remote receiver, and a rotor comprising a poled magnet associated in magnetic relation with said core and coil.

13. An electromagnetic device adapted for use as a transmitter or receiver, comprising a stator having a core of magnetically permeable material, an auto-transformer coil on said core and having a plurality of connections intermediate its ends, said coil being arranged for energization by a periodically varying current, and a rotor comprising a poled magnet associated in magnetic relation with said core and coil.

14. In combination, a magnetic compass having a magnet rotatable under the influence of the earth's magnetic field, an electrical transmitting device at the compass and having a wound stator in magnetic relation with said compass magnet, whereby the latter serves as a rotor of said transmitting device for producing electrical energy in said stator in accordance with the amount and direction of relative angular movement between said stator and magnet, a remote electrical receiving device having a rotor and a stator associated in cooperative relation with each other, means at said receiving device drivably connected to the rotor thereof for actuation thereby, and means electrically connecting said transmitting device to said receiving device independently of any follow-up motor or other electro-mechanical torque-amplifying device, for controlling angular movement of the receiver rotor by and in accordance with the relative angular movement of said compass magnet.

15. In combination, a transmitter comprising first core means of magnetically permeable material, a winding on said first core means having a plurality of connections intermediate its ends, a rotatable magnet in influencing relation with said core means for inducing a magnetic flux therein, a receiver comprising second core means of magnetically permeable material, a winding on said second core means and also having a plurality of connections intermediate its ends, the connections of said first winding being electrically connected to corresponding connections of said second winding, a source of periodically varying current connected to energize both of said windings, and a rotatable magnet associated in magnetic relation with said second core means and winding for actuation by the reaction between its own field and the field produced by said second winding upon rotation of the magnet at the transmitter.

16. In combination, a transmitter comprising first core means of magnetically permeable material arranged to be traversed by a uni-directional magnetic field for inducing a magnetic flux therein, a winding on said first core means having a plurality of connections intermediate its ends, a receiver comprising second core means of magnetically permeable material, a winding on said second core means and also having a plurality of connections intermediate its ends, the connections of said first winding being electrically connected to corresponding connections of said second winding, a source of periodically varying current connected to energize both of said windings, and a rotatable magnet associated in magnetic relation with said second core means and winding for actuation by the reaction between its own field and the field produced by said second winding upon relative angular displacement between said first core means and the field by which it is traversed.

17. An electromagnetic device adapted for use as a transmitter or receiver, comprising relatively stationary core means of magnetically permeable material, coil means on said core means and having at least three connections, certain of said connections being arranged for connection to a source of periodically varying current, a rotatable magnet associated in magnetic relation with said core means and coil means, and shielding means of magnetic material for shielding said device to prevent interaction with external magnetic fields, said shielding means also serving to provide a return magnetic path for the magnetic flux induced in said core means by said rotatable magnet.

18. An electromagnetic device adapted for use as a transmitter or receiver, comprising a stator having a core of magnetically permeable material, an auto-transformer coil on said core and having a plurality of connections intermediate its ends, said coil being arranged for energization by a source of periodically varying current, a rotor comprising a poled magnet associated in magnetic relation with said core and coil, and shielding means of magnetic material for shielding said device to prevent interaction with external magnetic fields, said shielding means also serving to provide a return magnetic path for the magnetic flux induced in said core by said poled magnet.

19. An electromagnetic device adapted for use as a transmitter or receiver, comprising relatively stationary core means of magnetically permeable material, an autotransformer coil on said core means and having a plurality of connections intermediate its ends, said coil being arranged for energization by a periodically varying current, a rotatable magnet associated in magnetic relation with said core means and coil, and shielding means of magnetic material for shielding said device to prevent interaction with external magnetic fields, said shielding means also serving to provide a return magnetic path for the magnetic flux induced in said core means by said rotatable magnet.

20. An electromagnetic transmitter comprising relatively stationary core means of magnetically permeable material adapted to be traversed by a uni-directional magnetic field, an auto-transformer coil on said core means and having a plurality of connections intermediate its ends, said coil being arranged for energization by a periodically varying current for inducing alternating current voltages therein when a uni-directional magnetic field traverses said core means, and shielding means of magnetic material for shielding said device to prevent interaction with undesirable magnetic fields.

21. In combination, a transmitter comprising first core means of magnetically permeable material, a winding on said first core means having a plurality of connections intermediate its ends, a movable magnet in influencing relation with said core means for inducing a magnetic flux therein; a receiver comprising second core means of magnetically permeable material, a winding on said second core means and also having a plurality of connections intermediate its ends, the connections of said first winding being electrically connected to the corresponding connections of said second winding, a source of periodically varying current connected to energize both of said windings, and a movable magnet associated in magnetic relation with said second core means and winding for actuation by the reaction between its own field and the field produced by said second winding upon movement of the first magnet relative to said first core means.

22. In combination, a transmitter comprising first core means of magnetically permeable material arranged to be traversed by a uni-directional magnetic field for inducing a magnetic flux therein, a winding on said first core means having a plurality of connections intermediate its ends, a receiver comprising second core means of magnetically permeable material, a winding on said second core means and also having a plurality of connections intermediate its ends, the connections of said first winding being electrically connected to the corresponding connections of said second winding, a source of periodically varying current connected to energize both of said windings, and a movable magnet associated in magnetic relation with said second core means and winding for actuation by the reaction between its own field and the field produced by said second winding upon relative movement between said first core means and the field by which it is traversed.

23. An electromagnetic device adapted for use as a transmitter or receiver, comprising relatively stationary core means of magnetically permeable material, a winding on said core means and having a plurality of connections intermediate its ends, said coil being arranged for energization by a periodically varying current, and a movable member comprising a poled magnet associated in magnetic relation with said core means and winding and movable with respect thereto.

24. A magnetic compass repeater system for transmitting the relative angular movements of the compass magnet to a remote point without the use of a follow-up motor or other electromechanical torque-amplifying device, comprising a magnetic compass having a magnet rotatable under the influence of the earth's magnetic field, an electrical transmitting device at the compass and having a wound stator in magnetic relation with said compass magnet, whereby the latter functions as a rotor of said transmitting device for producing electrical energy in said stator in accordance with the amount and direction of relative angular movement between said stator and compass magnet, an electrical receiving device at the remote point and having a rotor and a stator associated in cooperative relation with each other, means at said receiving device drivably connected to the rotor thereof for actuation thereby, and means electrically connecting said transmitting device and said receiving device independently of any follow-up motor or other electro-mechanical torque-amplifying device, for controlling angular movement of said receiver rotor by and in accordance with the relative angular movement of said compass magnet.

PAUL F. BECHBERGER.